(12) United States Patent
Cline et al.

(10) Patent No.: US 7,000,460 B1
(45) Date of Patent: Feb. 21, 2006

(54) MULTIPLE ENGINE TEST SYSTEM

(75) Inventors: Edward D. Cline, New Bern, NC (US); Jay A. Collins, New Bern, NC (US); Joshua L. Guthrie, Harkers Island, NC (US); Michael McClees, Harelock, NC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 7 days.

(21) Appl. No.: 10/801,171

(22) Filed: Mar. 9, 2004

(51) Int. Cl.
*G01M 15/00* (2006.01)

(52) U.S. Cl. .................................................... 73/116

(58) Field of Classification Search ............... 73/116, 73/117.2, 117.3, 118.1, 119 R
See application file for complete search history.

(56) References Cited

U.S. PATENT DOCUMENTS

| | | | |
|---|---|---|---|
| 2,823,756 A * | 2/1958 | Bridge et al. ............ 181/203 |
| 3,640,658 A * | 2/1972 | Price ........................ 425/63 |
| 3,710,617 A * | 1/1973 | Andersen .................. 73/116 |
| 4,174,627 A | 11/1979 | Swis et al. |
| 4,285,233 A * | 8/1981 | Swis ......................... 73/116 |
| 4,328,703 A | 5/1982 | McClure et al. |
| 4,395,180 A * | 7/1983 | Magnotte ................ 414/282 |
| 4,511,112 A | 4/1985 | Ruehle |
| 4,602,499 A * | 7/1986 | Norton et al. ............. 73/41 |
| 4,732,036 A * | 3/1988 | Weeder .................. 73/118.1 |
| 4,932,628 A | 6/1990 | Pacheco |
| 4,941,347 A * | 7/1990 | Iijima et al. .............. 73/116 |
| 4,951,498 A * | 8/1990 | Kiuchi .................... 73/117.3 |
| 5,238,126 A | 8/1993 | Rindoks |
| 5,383,652 A * | 1/1995 | Van Den Berg ........... 269/17 |
| 5,547,304 A * | 8/1996 | Cascio ..................... 403/13 |
| 5,600,059 A * | 2/1997 | Sondey .................... 73/116 |
| 5,627,311 A * | 5/1997 | Nakaya et al. ............ 73/147 |
| 5,653,351 A * | 8/1997 | Grout et al. ............. 212/315 |
| 5,851,007 A | 12/1998 | Swartzlander et al. |
| 6,343,504 B1 * | 2/2002 | Shultz ................... 73/118.1 |

* cited by examiner

*Primary Examiner*—Eric S. McCall
(74) *Attorney, Agent, or Firm*—Mark O. Glut

(57) ABSTRACT

A multiple engine test system that includes an engine test bed system for holding a specific engine type, a mounting frame, and a handling system for transporting the engine test bed system from storage to the mounting frame. The engine test bed system has all the peculiar testing components required for the specific engine type, and the mounting frame communicating with the engine test bed system.

12 Claims, 3 Drawing Sheets

MULTIPLE ENGINE TEST SYSTEM

STATEMENT OF GOVERNMENT INTEREST

The invention described herein may be manufactured and used by or for the Government of the United States of America for governmental purposes without payment of any royalties thereon or therefor.

BACKGROUND

The present invention relates to a multiple engine test system. More specifically, but without limitation, the present invention relates to a test bed system that tests different types of engines.

Testing of engines, specifically, but without limitation, military aircraft engines require different test components and test cells for different engines. Currently there are designated test cells and testing areas for each type of engine. This utilizes excess space and limits the type of engine that can be tested. Historically, engine test cells, specifically turboshaft engine test cells, were built exclusively to meet the requirements of a single engine type. This required significant manpower and incurred significant costs, as well as requiring different engine test sites for each type of engine. Thus there is a need for a universal test bed and testing system.

Thus, there is a need in the art to provide a multiple engine test system that incorporates the listed benefits without the limitations inherent in present methods. For the foregoing reasons, there is a need for a multiple engine test system.

SUMMARY

The present invention is directed to a multiple engine test system that includes an engine test bed system for holding a specific engine type, a mounting frame, and a handling system for transporting the engine test bed system from storage to the mounting frame. The engine test bed system has all the peculiar testing components required for the specific engine type, and the mounting frame is able to hold the engine test bed system securely.

It is an object of the invention to provide a multiple engine test system that can test any type of engine, particularly any type of aircraft engine.

It is an object of the invention to provide a multiple engine test system that is a universal test bed and engine testing system.

It is an object of the invention to provide a multiple engine test system that is highly configurable and is able to meet different engine requirements.

It is an object of the invention to provide a multiple engine test system that reduces manpower and set-up costs.

It is an object of the invention to provide a multiple engine test system that allows use of different engine test bed systems for each particular engine type.

DRAWINGS

These and other features, aspects and advantages of the present invention will become better understood with reference to the following description and appended claims, and accompanying drawings wherein:

DESCRIPTION

Figure 1:
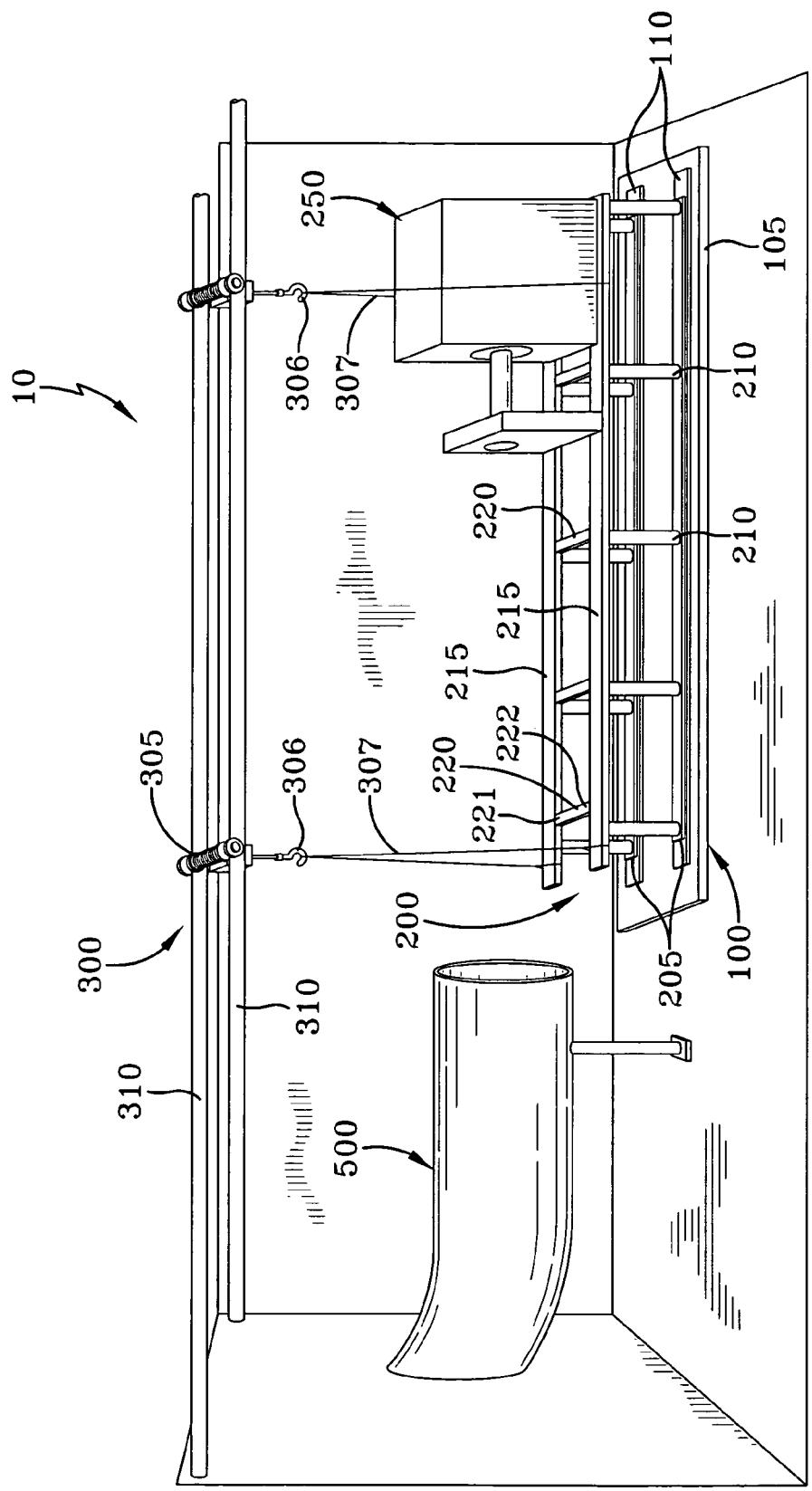
FIG. 1 is a perspective view of one of the embodiments of the multiple engine test system.
Figure 2:
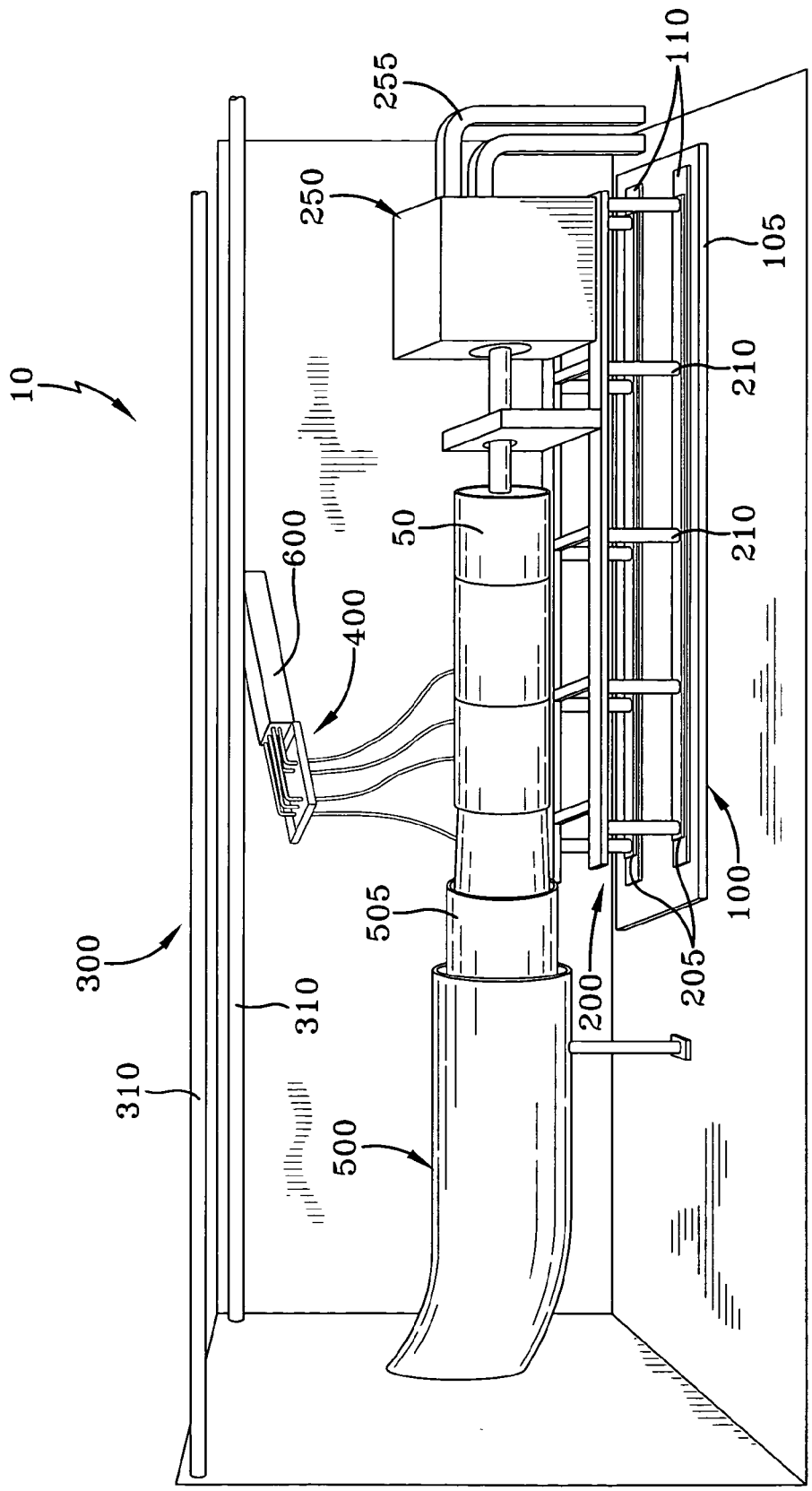
FIG. 2 is a perspective view of another one of the embodiments of the multiple engine test system in use.
Figure 3:
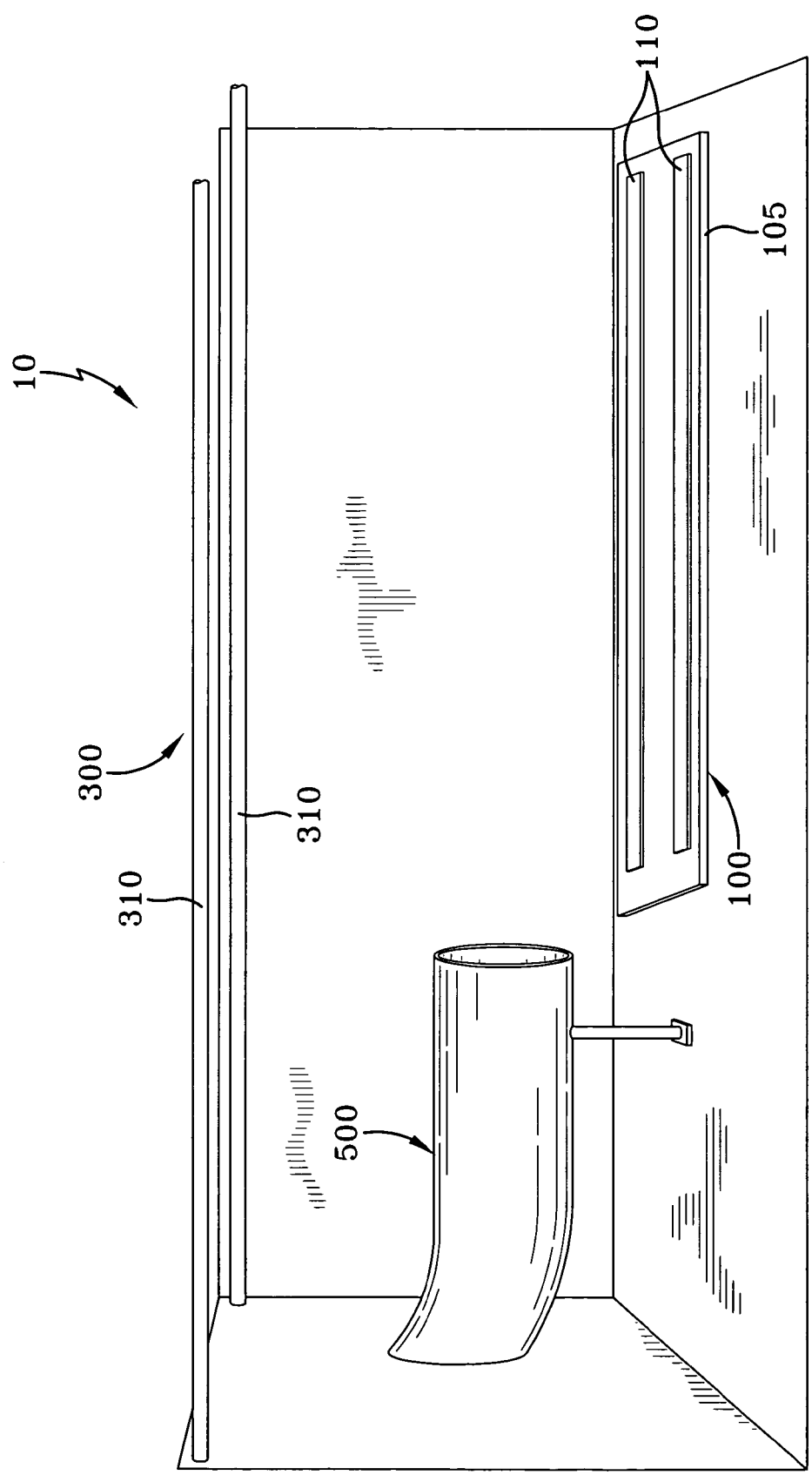
FIG. 3 is a perspective view of an embodiment of the multiple engine test system without the engine test bed system.

The preferred embodiments of the present invention are illustrated by way of example in FIGS. 1, 2, and 3. As seen in FIGS. 1 and 2, the multiple engine test system 10 includes an engine test bed system 200 for holding a specific engine type, a mounting frame 100 and a handling system 300 for transporting the engine test bed system 200 from storage to the mounting frame 100. The engine test bed system 200 includes all peculiar testing components required for testing the specific engine type 50, and the mounting frame 100 is able to hold the engine test bed system 200 securely.

In the discussion of the present invention, the system will be discussed in an aircraft engine environment, specifically a military turboshaft aircraft engine environment, however, the system can also be utilized for any other type of engine. In addition, this system will also be discussed in an indoor testing facility environment; however, it may be utilized anywhere practicable.

The mounting frame 100 may be, but without limitation, a common platform used to hold unique engine test bed systems 200 securely. As seen in FIG. 3, the mounting frame 100 may include a platform 105 or base with a pedestal 110. In the preferred embodiment, the platform 105 may be substantially rectangular and contain at least two pedestals 110. Each pedestal 110 may be substantially rectangular, smaller in size than the platform 105, and the pedestals 110 may be substantially similar in size and shape and substantially parallel. In the preferred embodiment, the engine test bed system 200 is mounted or placed on the mounting frame 100.

The engine test bed system 200 may be defined, but without limitation, as a removable engine test bed. It can also be defined as, but without limitation, a transportable turboshaft engine test bed that houses all of the detailed hardware required to perform operational and test procedures on a specific aircraft turboshaft engine 50. The engine test bed system 200 may communicate with or rest on the pedestal(s) 110. The engine test bed system 200 may contain all of the peculiar testing components 250 required for the testing of a specific engine type 50. For instance, a particular engine test bed system 200 may include, but without limitation, a dynamometer, a flywheel, and the like. The engine test bed system 200 may be customized to each particular engine 50.

The engine test bed system 200 may be a support with support beams 205, support columns 210, top beam members 215, and top member connecting beams 220. As seen in FIG. 1, the preferred embodiment of the engine test bed system 200 has two support beams 205 and two top beam members 215. Each support beam 205 may communicate with or rest on a pedestal 110. The support beam 205 may have a substantially rectangular cross section with the longer side resting on the pedestal 110. The support columns 210 are perpendicularly attached to the support beams 205. The top beam members 215 are perpendicularly attached to the support columns 210. The top member connecting beams 220 are perpendicularly attached to both top beam members 215. As seen in FIG. 1, the top member connecting beam 220 may have a first end 221 and a second end 222 wherein each respective end is perpendicularly attached to a top beam member 215. On the top beam members 215 the testing components 250 may be disposed.

As seen in FIG. 1, the preferred embodiment of the handling system 300 for transporting the engine test bed system 200 from storage to the mounting frame 100 includes an overhead hoist 305 which can transport the engine test bed system 200, and an overhead rail system 310. The overhead hoist 305 may ride on the overhead rail system 310. As seen in FIG. 1, the overhead hoist 305 may include a hook system 306 and a cord system 307 for holding and supporting the engine test bed system 200. However, any other type of holding and supporting system may be utilized, such as, but without limitation, a magnet system, a cord system only, or a suction system. The overhead rail system 310 leads from the test area to a storage area where all the unique engine test bed systems 200 are stored. The overhead hoist 305 may also be used to move and install any engine 50 being tested. The overhead rail system 310 may also lead to an area where engines 50 are placed or stored prior to testing. The handling system 300 may take any other form that is practicable, such as, but without limitation, wheel rail system, caster rail system, standard warehouse handling system, electromagnetic type system, etc.

The multiple engine test system 10 may also include an exhaust duct 500. The exhaust duct 500 intakes air and discharge from the engines 50 when they are being tested, and transports this air and discharge either outside or to another area. Engines 50 typically have an engine exhaust which discharges engine fumes and exhaust. The exhaust duct 500 may intake these fumes and exhaust away from the test area. The exhaust duct 500 may be an adjustable exhaust duct 505 that can change sizes in order to accommodate different types of engines 50. The exhaust duct 500 may be telescopic and extend as seen in FIG. 2.

The multiple engine test system 10 may also include an engine interface harness 400. An engine interface harness 400 may be defined, but without limitation, as an apparatus that adapts specific connection requirements to the universal test cell connections 600. The engine interface harness 400 may adapt specific engines 50 to universal testing connections and components. The universal testing connections and components and specific testing components 250 may be attachable to standardized connectors and adapters 255 to obtain facilities requirements such as, but without limitation, water, hydraulics, power, etc.

The multiple engine test system 10 is shown in use in FIG. 2. The engine 50 is attached to the peculiar testing components 250, the universal test cell connections 600 and to the adjustable exhaust duct 505. After testing is complete, the engine 50 may be removed from the engine test bed system 200 and the engine test bed system 200 may be removed and replaced with a different engine test bed system 200 to test another type of engine 50.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred versions thereof, other versions are possible. Therefore, the spirit and scope of the appended claims should not be limited to the description of the preferred versions contained herein.

What is claimed is:

1. A multiple engine test system, comprising:
   a. a removable engine test bed system for holding and testing a specific engine type, the engine test bed system comprising customized testing components for the specific engine type, the customized testing components mounted on the engine test bed system;
   b. a mounting frame, the removable engine test bed system able to rest on top of the mounting frame and be removable from the mounting frame; and
   c. a handling system for transporting the engine test bed system from storage to the mounting frame, the handling system being a two rail overhead track system.

2. The multiple engine test system of claim 1, wherein the multiple engine test system further comprises an engine interface harness for adapting specific engine connections to universal testing connections and components.

3. The multiple engine test system of claim 2, wherein the multiple engine test system further comprises an exhaust duct, the specific engine type having an engine exhaust, the exhaust duct intaking discharge from the engine exhaust.

4. The multiple engine test system of claim 3, wherein the exhaust duct is adjustable to accommodate different types of engines.

5. A multiple aircraft engine test system, comprising:
   a. a removable transportable engine test bed system for holding and testing a specific aircraft engine type, the transportable engine test bed system comprising customized testing components for the specific aircraft engine type, the customized testing components mounted on the engine test bed system, the customized testing components being at least a dynamometer and a flywheel;
   b. a mounting frame, the engine test bed system able to rest on top of the mounting frame, the transportable engine test bed system removable from the mounting frame and removable from testing frame;
   c. a handling system for transporting the transportable engine test bed system from storage to the mounting frame, the handling system being an overhead track system;
   d. an exhaust duct, the specific aircraft engine type having an engine exhaust, the exhaust duct intaking discharge from the engine exhaust, the exhaust duct being adjustable to accommodate different types of engines; and
   e. an engine interface harness for adapting specific engine connections to universal test cell connections and components.

6. The multiple engine test system of claim 5, wherein the engine test bed system comprises of support beams, support columns, top beam members, and top member connecting beams, the support columns perpendicularly attached to the support beams, the top beam members perpendicularly attached to the support columns, the top member connecting beams perpendicularly attached to the top beam members, the support beams communicating with the mounting frame.

7. The multiple engine test system of claim 6, wherein there are two support beams and two top beam members.

8. The multiple engine test system of claim 7, wherein the mounting frame comprises of a platform and a pedestal, the pedestal disposed on top of the platform, the two support beams resting on the pedestal.

9. The multiple engine test system of claim 8, wherein the mounting frame includes two pedestals, with each support beam resting on a pedestal.

10. The multiple engine test system of claim 9, wherein the two rail overhead track system comprises of two overhead rails and an overhead hoist which can transport the engine test bed system and the engine, and the overhead hoist being able to ride on the overhead rails.

11. The multiple engine test system of claim 10, wherein the multiple engine test system further comprises of standardized connectors and adaptors, the standardized connectors and adaptors attachable to the testing components for the specific engine type.

12. The multiple engine test system of claim 11, wherein the overhead hoist includes a hook system and a cord system, the hook system holding the cord system, the cord system for holding the transportable engine test bed system.

* * * * *

UNITED STATES PATENT AND TRADEMARK OFFICE
CERTIFICATE OF CORRECTION

PATENT NO. : 7,000,460 B1
DATED : February 21, 2006
INVENTOR(S) : Cline et al.

It is certified that error appears in the above-identified patent and that said Letters Patent is hereby corrected as shown below:

Title page,
Item [75], Inventors, fourth listed inventor's residence should read -- Havelock, NC --.

Column 4,
Line 32, should read -- frame and removable from the mounting frame. --.

Signed and Sealed this

Thirtieth Day of May, 2006

JON W. DUDAS
*Director of the United States Patent and Trademark Office*